March 25, 1952 — H. W. PITTENGER — 2,590,455
MICROMETER HEIGHT GAUGE
Filed Feb. 3, 1949 — 2 SHEETS—SHEET 1
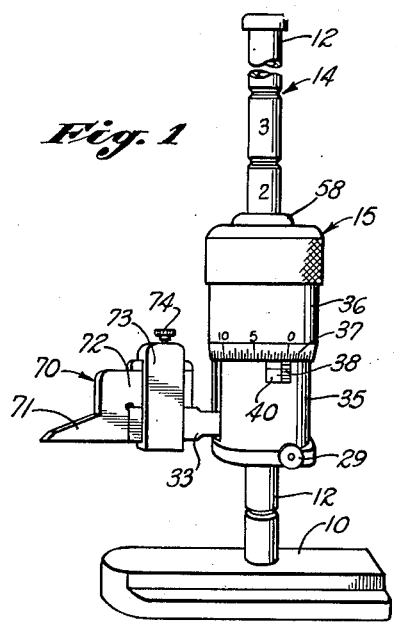
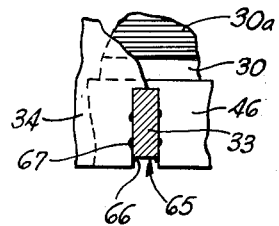
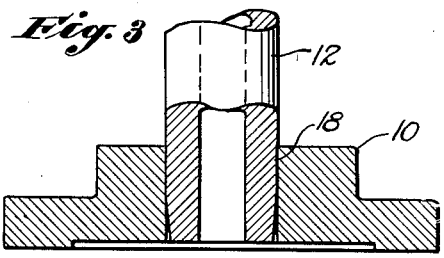
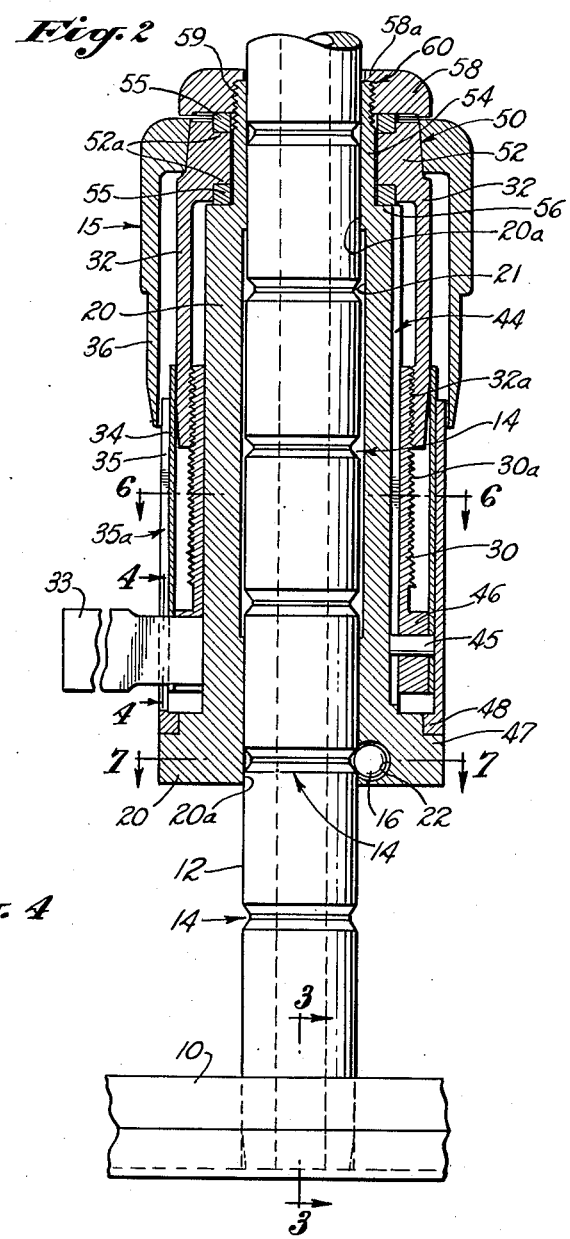
INVENTOR:
HAROLD W. PITTENGER
BY HIS ATTORNEYS
HARRIS, KIECH, FOSTER & HARRIS March 25, 1952  H. W. PITTENGER  2,590,455
MICROMETER HEIGHT GAUGE
Filed Feb. 3, 1949  2 SHEETS—SHEET 2
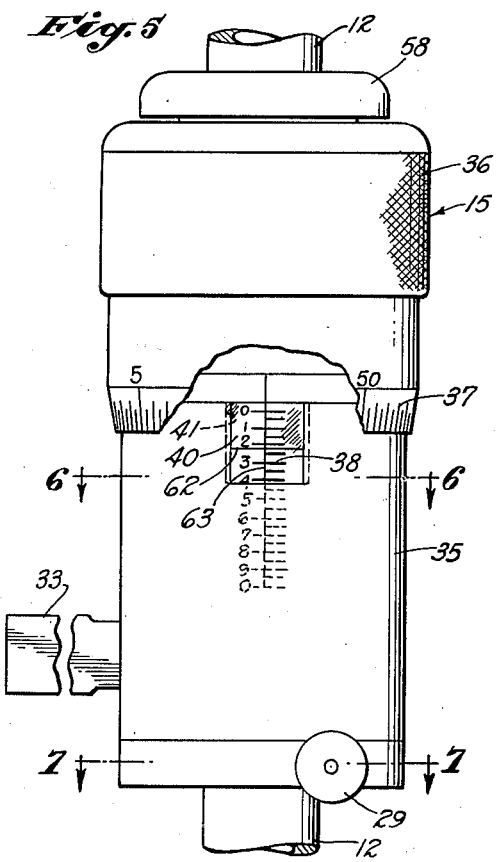
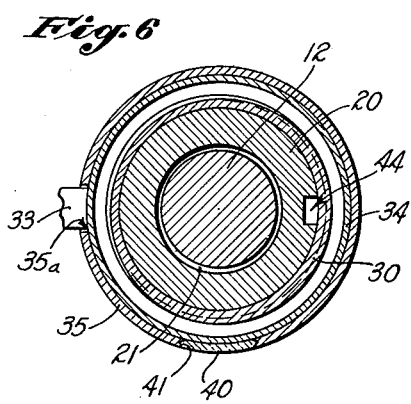
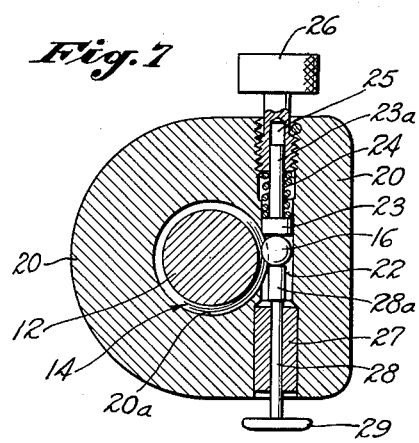
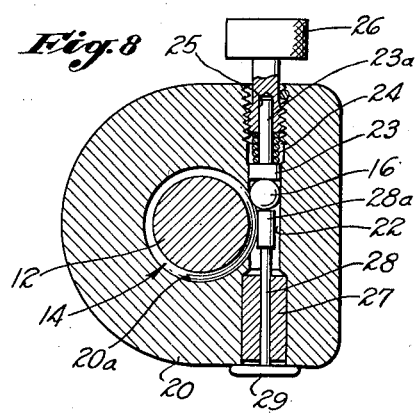
INVENTOR:
HAROLD W. PITTENGER
BY HIS ATTORNEYS
HARRIS, KIECH, FOSTER & HARRIS Patented Mar. 25, 1952

2,590,455

UNITED STATES PATENT OFFICE 2,590,455

MICROMETER HEIGHT GAUGE

Harold W. Pittenger, Los Angeles, Calif., assignor to Robert E. Noble, San Diego, Calif.

Application February 3, 1949, Serial No. 74,292

17 Claims. (Cl. 33—170)

This invention relates to precision instruments, and more particularly to gages for measuring the vertical dimensions of articles being manufactured under rigid dimensional requirements.

The particular form of device of the present disclosure is a height gage comprising an appropriate base and a vertical post having thereon an adjustable micrometer head provided with a projecting arm adapted to be brought into contact with an upper surface of work to be measured, such work to be carried upon the base of the structure or upon other appropriate support representing a predetermined accurate height, so that accurate measurement may be had by manipulation of the micrometer adjustment means controlling the positioning of the projecting arm with respect to the work being measured. In connection with precision instruments of the type herein disclosed, it is necessary that all parts of the gage be carefully machined and that their manufacture provide for an assembly which assures accurate movements without play or distortion in any position, whereby to insure that readings are invariably absolutely accurate within the infinitesimal tolerances permitted for precision work. I have found that precision work and precision readings can be performed and performance maintained only where all positioning surfaces are of adequate extent and are arranged and held in proper relationship, and where wear is substantially eliminated by exclusion of dust and cuttings from the working surfaces which include threads and surfaces disposed in sliding contact with one another.

It is, therefore, a principal object of my invention to produce precision gaging instruments in which all operative parts requiring precision movement are properly organized to insure and maintain precision movement and wherein all such parts are protected against the entrance of dust, cuttings, grindings and similar foreign matter.

More particularly it is an object of this invention to provide in a precision gaging instrument wherein an elongated supporting post is employed a suitably elongated body sleeve member adapted to be slidably mounted upon the post in accurately adjusted position, such body sleeve member carrying thereon suitably elongated movable measuring means providing adequate bearing contact with the body member thereby to avoid all types of distortion and to assure accurate reading when a work engaging arm or the like is properly brought into contact with the work to be measured.

It is an additional object to provide in such an instrument means which adequately exclude from the contacting surfaces and threads of the instrument all foreign matter which tends to wear the contacting surfaces or threads or micrometer scales appearing on the cooperating parts. A related object is to provide in a precision instrument of the gaging type outer, sleeve-like members disposed in overlapping relation so that they may serve as guard means to exclude foreign matter at all times and under all positions and conditions of adjustment. A further related object is to provide in an outer protecting sleeve or guard casing a window disposed in front of the micrometer scale, whereby to protect the scale from foreign matter as the parts are moved during measuring operations and to exclude foreign matter at all times.

Other objects of the invention, and the various features of novelty, will become apparent to those skilled in the art upon reference to the accompanying drawings and the following specification wherein preferred embodiments of the invention are disclosed.

In the drawings:

Fig. 1 is primarily a side elevation of a height gage incorporating the improvements of this invention;

Fig. 2 is a vertical section on an enlarged scale of the micrometer head and supporting post of this invention;

Fig. 3 is a vertical sectional detail taken on the line 3—3 of Fig. 2;

Fig. 4 is a fragmentary elevational detail taken approximately from the line 4—4 of Fig. 2;

Fig. 5 is an enlarged elevational view of the micrometer head of Figs. 1 and 2, portions being broken away;

Fig. 6 is a cross-sectional view taken on the line 6—6 of Figs. 2 and 5;

Fig. 7 is a cross section taken on the line 7—7 of Figs. 2 and 5; and

Fig. 8 is a cross section corresponding with that of Fig. 7 and showing the locking ball mechanism of Fig. 7 in unlocked position.

The instrument disclosed comprises a base 10 which supports an upright graduated post 12, the graduations being in the form of annular grooves 14 tapered radially inward to form a substantially V-shaped configuration in cross section for reception of locking means carried by a micrometer head 15 slidably mounted upon the post 12. Such locking means include a locking ball 16, as shown in Figs. 2, 7 and 8. The lower end of the post 12 is secured in the base 10 as by means of a conventional press fit 18, as indicated in Fig. 3.

The micrometer head 15 comprises a body member which is in the form of a sleeve 20 provided with an axial bore 20a having a dimension to provide a neat, sliding fit upon the cylindrical surface portions of the post 12 at the opposite ends of such body sleeve 20. To facilitate sliding movement of the body sleeve 20, the latter is relieved through its intermediate portion as indicated at 21. For the purpose of positioning the locking ball 16 in proper relationship to the annular adjusting grooves 14, the lower end of the body sleeve 20 is provided with a transverse small bore 22 which tangentially intercepts the adjacent axial bore 20a in the body sleeve 20. The locking ball 16 is normally held in a locking position substantially as illustrated in Fig. 7, one side thereof being in engagement with the converging walls of the respective annular groove 14 and the opposite side bearing against corresponding wall portions of the small bore 22. The ball 16 is urged into its normal operative position of Fig. 7 through the medium of a plunger 23 under influence of a spring 24 disposed about the stem 23a of the plunger 23. The stem 23a is received in a slender bore 25 axially disposed in a thumb screw 26 which is threaded into an enlarged outer end portion of the bore 22. The opposite end portion of the bore 22 receives a plug 27 which axially receives a plunger 28 having an enlarged end 28a engaging the locking ball 16, and provided at its outer end with a head 29 through which the plunger 28 and its enlargement 28a may be moved to dislodge the ball 16 from locking position by forcing the ball and the opposing plunger 23 against the tension of the springs 24 into the unlocking position illustrated in Fig. 8. As will be apparent, when the ball 16 has been moved by the plunger 28 to the unlocking position of Fig. 8, the micrometer head 15, including the body sleeve 20, may be moved up and down on the post 12 to bring the locking ball 16 into registry with any one of the annular adjusting grooves 14. Upon release of the plunger head 29, the spring 24 returns the locking ball 16 into the locking position illustrated in Fig. 7. In practice the annular grooves 14 are accurately spaced apart a predetermined distance, for example one inch, so that the elevation of the micrometer head 15 from the base 10, or any other reference point, may be accurately shown, the inches being numbered on the post 12 as indicated in Fig. 1.

In addition to the body sleeve 20, the micrometer head 15 principally comprises a lead screw sleeve 30 accurately fitted to slide along the accurately machined, smooth outer surface of the body sleeve 20, an internally threaded sleeve-like nut 32 engaging the lead screw thread 30a and rotatably fixed upon the outer end of the body sleeve 20, a gaging arm 33 fixed to the lower end of the lead screw sleeve 30 and projecting laterally from the head 15 to engage upon an upper surface of work being measured, a guard sleeve or dust sleeve 34 fixed to the lower end of the lead screw sleeve 30 and to the inner end of the gaging arm 33 and movable therewith on the outer surface of the nut 32, an outer guard casing 35 secured to the base of the body sleeve 20 and within which the dust sleeve 34 slides vertically, and a micrometer barrel 36 non-rotatably fixed at its top to the upper end of the nut 32 with its lower, skirt portion depending around the upper end of the outer guard casing or sleeve 35.

The outer guard casing 35 is provided at one side with a vertical slot 35a through which the gaging arm 33 projects and in which it slides vertically. The lower edge of the micrometer barrel 36 is beveled as indicated and provided with a micrometer scale 37 extending annularly around the barrel. The extreme lower edge of the barrel 36 and the bottom of the scale 37 overlie a vertical scale 38 which is carried at one side of the dust sleeve 34 and is visible through a transparent window 40 set into the upper overlying portion of the outer guard casing 35 as best indicated in Figs. 5 and 6 where the vertical edges of the window 40 are dovetailed into correspondingly notched or channeled edges 41 extending downward from the top of the guard casing 35.

The accurate fit of the lead screw sleeve 30 upon the outer cylindrical surface of the body sleeve 20 insures accurate positioning at all times of the gaging arm 33, and this construction makes it possible to machine the engaging cylindrical surfaces with precision which is essential in instruments of this type. Since the lead screw sleeve 30, carrying the gaging arm 33, is required to slide vertically upon the body sleeve 20 without rotation, the latter is provided at one side with a vertically extending key way 44 in which there is received the inner end of an accurately fitted key 45 whose outer portion is embedded in a lower, annular ring section 46 integral with the bottom of the lead screw sleeve 30. The outer end of the key 45 is fixed in the adjacent lower end of the dust sleeve 34, thereby insuring movement of the dust sleeve 34 with the lead screw sleeve 30 and preventing rotation of the dust sleeve 34 with respect to the lead screw sleeve 30 and the body sleeve 20. By reason of engagement of the external threads 30a of the lead screw sleeve 30 with the internal threads 32a of the nut 32, rotation of the nut 32 through the medium of the barrel 36 causes the lead screw 30 and the dust sleeve 34 to slide up and down on the body sleeve 20 and within the outer guard casing 35, such movement being guided by the inner end of the key 45 working in the key way 44. Movement of the outer guard casing 35 with the dust sleeve 34 is prevented by reason of the fact that the lower end of the guard casing 35 is rigidly held on the lower end of the body sleeve 20 through the medium of a press fit between a stepped shoulder 47 of the body sleeve 20 and an inwardly disposed annulus 48 integrally carried by the lower end of the dust sleeve 35.

The previously described rotatable mounting of the internally threaded nut 32 and its micrometer barrel 36 upon the upper end of the body sleeve 20 is such as to prevent axial movement of the nut 32 with respect to the body sleeve 20 and to prevent any movement of the micrometer barrel 36 with respect to the internally threaded nut 32. Such mounting of the barrel 36 upon the nut 32 is secured by means of a rigid press fit upon the top of the nut 32 as indicated by the contact line 50 in Fig. 2 where the knurled head portion of the barrel 36 is mounted upon an overhanging head portion 52 of the nut 32, such head portion 52 being provided with a bore rotatably receiving a reduced cylindrical extension 54 of the upper portion of the body sleeve 20. The upper and lower annular edges adjacent the bore through the head portion 52 are grooved to provide shoulders 52a, and these grooves receive anti-friction bearing washers in the form of upper and lower bearing rings 55 which are disposed against the respective shoulders 52a. The lower face of the lower bearing ring 55 bears upon an annular shoulder 56 provided at the top of the body sleeve 20 where the latter is stepped annularly inward to produce the reduced extension 54. Thus, the head portion 52 of the internally threaded nut 32 is accurately and rotatably positioned and maintained axially with respect to the body sleeve 20. The lower bearing ring 55 and the head portion 52 of the nut 32 are pressed into proper relationship with the shoulder 56 of the body sleeve 20 through the medium of the upper bearing ring 55 and a lock nut 58 which is threadedly engaged at 59 with the extension 54 of the body sleeve 20. The locking feature of the nut 58 is provided by an accurately machined, inwardly directed overhanging flange 58a which binds upon the outer extremity of the extension 54 as indicated at 60. Such accurate disposition of the locking nut 58 provides for accurate retention of the threaded nut 32, the bearing ring 55, and also the micrometer barrel 36, upon the top of the body sleeve 20.

From the foregoing, it will be seen that when the knurled, upper portion of the micrometer barrel 36 is grasped and rotated by the operator, such rotation is imparted through the press fit indicated at 50 to the internally threaded nut 32 through its head 52 so that the nut 32 rotates, without axial movement, upon the body sleeve 20. Such rotation causes the threads 32a of the threaded nut 32 to move relatively along the threads 30a of the lead screw sleeve 30, with the result that the lead screw sleeve 30 slides up or down along the body sleeve 20 in accordance with the direction of rotation of the micrometer barrel 36, thereby correspondingly raising or lowering the gaging arm 33 and the dust sleeve 34, such movement being guided by the travel of the key 45 in the key way 44 of the body sleeve 20. Under these circumstances, the gaging arm 33 slides in the slot 35a of the outer guard casing 35 and the dust sleeve 34 slides within the outer guard casing 35 so that the vertical scale 38 on the dust sleeve 34 moves behind the window 40 in the guard casing 35 and behind the lower end of the micrometer barrel 36 whereby the lower edge thereof at the bottom of the micrometer scale 37 provides a reference point by which the scale 38 is read. However, if preferred, the reference point for reading the scale 38 may be in the form of a crossline 62 (Fig. 5) formed on the window 40, a vertical line 63 being provided on the window 40 as a reference point for reading the micrometer scale 37.

As previously indicated, the gaging arm 33 has its inner end fixed in the annular ring section 46 of the lead screw sleeve 30. This may be accomplished as indicated in Figs. 2 and 4, by forming a downwardly opening notch 65 in the ring section 46 and brazing the arm 33 in place as indicated at 66. The lower end of the dust sleeve 34 is similarly notched, as indicated in Fig. 4, to receive the gaging arm 33, and these parts similarly may be rigidly connected by brazing as indicated at 67. As best indicated in Fig. 1, the outer end of the gaging arm 33 is adapted to receive any form of gaging head 70 which may include a gaging finger 71 projecting outward away from the instrument, such finger 71 having a portion 72 adapted to overhang the outer end of the gaging arm 33 and to be clamped into position by any appropriate means such as the loop clamp 73 and thumb screw 74 illustrated.

From the foregoing, it will be apparent that the gaging head 15 which carries the scales 37 and 38 and their respective parts, and therefore constitutes a micrometer head, is adapted to be bodily raised and lowered upon the post 12 by moving the locking ball 16 to the disengaging position of Fig. 8, and shifting the head 15 to any appropriate height so that the locking ball 16 may be placed in locking position within the selected annular positioning group 14. Dislodgement of the locking ball 16 is readily effected by pressure upon the head 29 of the plunger 28. Return of the ball 16 to locking position, as indicated in Fig. 7, is effected through the medium of the spring 24 working upon the opposite plunger 23. Such locked position of the ball 16 is retained by turning the thumb screw 26 to force the plunger 23 into fixed contact with the ball 16, either by compressive collapsing of the spring 24 or by engagement of the end of the bore 25 with the inner end of the stem 23a. The gaging arm 33 and its gaging finger 71 are then moved into proper contact with the work to be measured, such movement being effected through rotation of the knurled micrometer barrel 36, the reading being then taken from the scales 37 and 38 and added to the inch marking appearing on the post 12. Should it be desired to rotate the finger 71 and the head 15 on the post 12, the ball 16 will travel around in the respective groove 14 upon unlocking the ball by slight loosening of the screw 26. Otherwise, any key system or the like may be used to prevent rotation of the head 15.

As also will be apparent from the foregoing description, the outer guard casing or sleeve 35 and the dust sleeve 34 very effectually exclude dust, grindings, cuttings, and other foreign particles from the micrometer threads 30a and 32a of the lead screw sleeve 30 and the internally threaded nut 32, as well as from the sliding contact area between the outer cylindrical surface of the body sleeve 20 and the inner cylindrical surface of the lead screw sleeve 30. As a consequence of these features of construction, a highly accurate precision instrument is provided by means of which accurate gaging may be had over a period of a very long instrument life.

Inasmuch as variations within the scope of the present invention will occur to those skilled in this art, it is intended to protect all modifications which fall within the scope of the patent claims.

I claim as my invention:

1. In combination in a gaging instrument: a post; a body sleeve having a bore providing a close sliding fit on said post; means to bind said body sleeve in predetermined position on said post; a lead screw sleeve having a bore providing a close sliding fit on said body sleeve and provided with external gaging threads; a gaging arm affixed to said lead screw sleeve adjacent one end of said body sleeve for movement with said lead screw sleeve, and projecting laterally therefrom; a nut provided with internal threads engaged with said lead screw threads, said nut being rotatably secured upon the other end of said body sleeve against longitudinal movement thereon; a gaging barrel rigidly secured on said nut and disposed therearound in spaced relation thereto; and cooperating micrometer scale means carried by said barrel and said lead screw sleeve.

2. A combination as in claim 1 including a guard casing fixed on said one end of said body sleeve around and in spaced relation to said lead screw sleeve and enclosing the scale means of said lead screw sleeve, said guard casing being slotted to pass said arm.

3. A combination as in claim 2 including a dust sleeve fixed to said lead screw sleeve to slide within said guard casing and outside said nut, said dust sleeve carrying a micrometer scale of said lead screw sleeve, and said guard casing having window means to view such micrometer scale.

4. A combination as in claim 3 wherein the free end of said barrel overlies said window means opposite said micrometer scale.

5. A combination as in claim 1 including a dust sleeve fixedly carried by said lead screw sleeve in spaced relation to said external threads to travel along the outer side of said nut and within said barrel, said dust sleeve carrying the micrometer scale means of said lead screw scale.

6. A combination as in claim 1 including a key connecting said lead screw sleeve with said body sleeve to provide for non-rotary sliding movement thereon.

7. In combination in a gaging instrument: an elongated body sleeve having an axial bore adapted for a close sliding fit on a supporting post and providing a smooth outer surface; a lead screw sleeve mounted against rotation on said body sleeve adjacent one end and having a central bore providing a close sliding fit on said outer surface of said body sleeve, said lead screw sleeve having external lead screw threads; an overhanging nut rotatably mounted on the other end of said body sleeve and retained thereon against axial movement, said nut having internal threads engaging said sleeve lead screw threads; a barrel fixed upon and around said nut and extending into outwardly spaced relationship with certain of said threads; scale means fixed to said lead screw sleeve and providing a micrometer scale cooperating with micrometer scale means on said barrel; and a gaging arm fixed to said lead screw sleeve to move therewith and projecting radially therefrom.

8. A combination as in claim 7 wherein said scale means secured to said lead screw sleeve comprises a dust sleeve surrounding said external threads and extending into operative relationship with the extending portion of said barrel, said dust sleeve carrying said micrometer scale.

9. A combination as in claim 8 including a guard casing fixed on said one end of said body sleeve and extending around said dust sleeve, said casing having an opening receiving said gaging arm and providing for movement of said arm therealong, said casing also having a window adjacent the extending portion of said barrel and its micrometer scale means and overlying a portion of said micrometer scale on said dust sleeve.

10. A combination as in claim 7 including a guard casing fixed on said one end of said body sleeve and extending around said lead screw sleeve and into cooperative relation with said barrel, said casing having an opening in which said arm is adapted to move and having a window adjacent said micrometer scale of said lead screw sleeve.

11. A combination as in claim 7 including guard sleeve means disposed around said lead screw sleeve.

12. In combination in a precision instrument: an elongated body sleeve having an axial bore adapted for a close sliding fit on a supporting post and providing a smooth outer surface; a lead screw sleeve mounted against rotation on said body sleeve adjacent one end and having a central bore providing a close sliding fit on said outer surface of said body sleeve, said lead screw sleeve having external lead screw threads; an overhanging nut rotatably mounted on the other end of said body sleeve and retained thereon against axial movement, said nut having internal threads engaging said lead screw threads; a barrel fixed upon and around said nut and extending into outwardly spaced relationship with certain of said threads; arm means fixed to said lead screw sleeve and projecting radially therefrom; and guard sleeve means disposed about said threads and extending into cooperative relationship with said extending barrel, said arm means extending through passage means provided by said guard sleeve means.

13. A combination as in claim 12 wherein said guard sleeve means comprises a dust sleeve fixed to said lead screw sleeve and a casing around said dust sleeve and fixed to said body sleeve.

14. In combination in a precision instrument: an elongated body sleeve having an axial bore adapted for a close sliding fit on a supporting post and providing a smooth outer surface; a lead screw sleeve mounted against rotation on said body sleeve adjacent one end and having a central bore providing a close sliding fit on said outer surface of said body sleeve, said lead screw sleeve having external lead screw threads; an overhanging nut rotatably mounted on the other end of said body sleeve and retained thereon against axial movement, said nut having internal threads engaging said lead screw threads; and work-engaging means affixed to and projecting from said lead screw sleeve.

15. In combination in a precision instrument: a post having annular locking grooves therein; a micrometer head comprising a body sleeve slidably mounted on said post and relatively movable gaging means mounted on said body sleeve, said body sleeve having a transverse bore; a locking ball mounted in said transverse bore to engage selectively in said grooves; yielding means engaging said ball to urge the latter into locking position; and movable engaging means movable to force said ball into unlocked position against the tension of said yielding means, said yielding means being a spring-pressed plunger mounted in said bore on one side of said ball and engaging means being a plunger held in said bore on the other side of said ball and having a portion projecting into accessible position beyond said bore.

16. In combination in a precision instrument: an elongated body sleeve having an axial bore adapted for a close sliding fit on a supporting post and providing a smooth outer surface; a lead screw sleeve mounted against rotation on said body sleeve adjacent one end and having a central bore providing a close sliding fit on said outer surface of said body sleeve, said lead screw sleeve having external lead screw threads; an overhanging nut rotatably mounted on the other end of said body sleeve and retained thereon against axial movement, said nut having internal threads engaging said lead screw threads; guard sleeve means connected with said lead screw sleeve; and guard sleeve means connected with said body sleeve, one of said guard sleeve means overlapping the other to exclude foreign particles.

17. In combination in a precision instrument: an elongated body sleeve having an axial bore adapted for a close sliding fit on a supporting post and providing a smooth outer surface; a lead screw sleeve mounted against rotation on said body sleeve adjacent one end and having a central bore providing a close sliding fit on said outer surface of said body sleeve, said lead screw sleeve having external lead screw threads; an overhanging nut rotatably mounted on the other end of said body sleeve and retained thereon against axial movement, said nut having internal threads engaging said lead screw threads; guard sleeve means connected to said body sleeve; and guard sleeve means connected to said nut, one of said guard sleeve means overhanging the other to exclude foreign matter.

HAROLD W. PITTENGER.

REFERENCES CITED

The following references are of record in the file of this patent:

UNITED STATES PATENTS

| Number | Name | Date |
| --- | --- | --- |
| 305,337 | Russom | Sept. 16, 1884 |
| 1,282,030 | Benemelis | Oct. 22, 1918 |
| 1,655,239 | Priputnevich | Jan. 3, 1928 |
| 1,656,927 | Wheelock | Jan. 24, 1928 |
| 1,883,975 | Kutniak | Oct. 25, 1932 |
| 1,949,280 | Lester | Feb. 27, 1934 |
| 2,252,146 | Walsh | Aug. 12, 1941 |
| 2,354,137 | Nystrom | July 18, 1944 |

FOREIGN PATENTS

| Number | Country | Date |
| --- | --- | --- |
| 420,278 | Great Britain | Nov. 28, 1934 |